US005713237A

United States Patent [19]

Bruns

[11] Patent Number: 5,713,237

[45] Date of Patent: Feb. 3, 1998

[54] SLIDE LOCK FOR STAMPING PRESS

[75] Inventor: Eilert F. Bruns, Naperville, Ill.

[73] Assignee: Clearing Niagara, Inc., Chicago, Ill.

[21] Appl. No.: 741,279

[22] Filed: Oct. 30, 1996

[51] Int. Cl.[6] .............................. B30B 15/14; B23P 11/00

[52] U.S. Cl. ................................ 72/444; 72/30; 29/893.1; 29/401.1; 100/53; 74/411.5

[58] Field of Search .............................. 72/444, 446, 449, 72/436, 30; 29/893.1, 401.1, 428; 100/53, 282, 292; 188/31, 60, 69, 170; 74/411.5

[56] References Cited

U.S. PATENT DOCUMENTS

| | | | |
|---|---|---|---|
| 2,417,781 | 3/1947 | Patrick | 72/444 |
| 3,704,757 | 12/1972 | Bures, III | 74/411.5 |
| 5,048,410 | 9/1991 | Teramoto et al. | 100/53 |
| 5,157,983 | 10/1992 | Sankovic | 74/411.5 |
| 5,269,059 | 12/1993 | Rozenbojm | 72/444 |
| 5,357,780 | 10/1994 | Brandstetter et al. | 72/444 |
| 5,513,561 | 5/1996 | Biliskov, Jr. et al. | 72/444 |
| 5,603,237 | 2/1997 | Bohman et al. | 72/444 |

FOREIGN PATENT DOCUMENTS

| | | | |
|---|---|---|---|
| 2384198 | 10/1978 | France | 72/444 |
| 2414435 | 10/1975 | Germany | 72/444 |
| 273529 | 11/1988 | Japan | 72/444 |

OTHER PUBLICATIONS

Publication entitled "Slide Lock for Gear–Driven Presses," published in Metal Forming, Oct., 1994.

*Primary Examiner*—David Jones

*Attorney, Agent, or Firm*—Emrich & Dithmar

[57] ABSTRACT

A slide lock is adapted for positioning within the upper portion, or crown, of a stamping press adjacent its eccentric gears. The slide lock includes a hydraulically actuated, electrically controlled module pivotally mounted to the press crown and including an acme screw and pivoting nut combination, a sector gear, an eccentric, and a sliding block attached to the eccentric. Locking of the slide of the press at any position of the press stroke is initiated by the linear displacement of the slide lock module and by rotating the eccentric to lower the slide lock module toward an eccentric gear. If the sector gear is able to fully mesh with the eccentric gear, the slide lock will continue to lower, with the eccentric rotating beyond its centerline, or beyond bottom dead center, until it contacts a closed, or locked, mechanical stop. The sector gear and eccentric gear are fully in mesh with the eccentric in an axial positive mechanical locked position to prevent press eccentric gear rotation and slide movement. If the sector and eccentric gears are unable to mesh, a hydraulic motor coupled to the acme screw linearly displaces the slide lock module through a pressure sensor control so that the sector gear is able to mesh with the eccentric gear. Rotation of the eccentric continues until the sector and eccentric gears are completely meshed and the eccentric is in the axial positive mechanical locked position with press eccentric gear rotation prevented and the press slide locked in fixed position.

16 Claims, 8 Drawing Sheets

SLIDE LOCK FOR STAMPING PRESS

FIELD OF THE INVENTION

This invention relates generally to gear-driven stamping presses and is particularly directed to the locking of the slide of a stamping press in a fixed position such as for performing maintenance on or reconfiguring the press in a safe manner.

BACKGROUND OF THE INVENTION

Sheet metal piece parts are typically formed by a series of stamping operations in a multi-stage mechanical transfer press which manipulates the workpiece to a desired shape and size. Each stamping operation employs a pair of dies which engage the sheet metal blank and forms it into the desired piece part. Operation of the stamping press is occasionally interrupted to conduct maintenance or to reconfigure the press such as by installing a new pair of dies to form a different piece part.

During such interruptions in operation, access to the inner workings of the press is required. This involves exposure of workers to the various press components of the press. Even with power removed from the press, the various components can move relative to one another such as under the influence of gravity. Safety is of the utmost concern during these operations because of the size and weight of the components and the high speed at which these components can move. It is thus necessary for the safety of the workers maintaining or reconfiguring the press to lock the moving press parts in a fixed position to provide the workers with safe access to the inner workings of the press.

One approach to locking the moving components of a gear-driven press in fixed position is disclosed in "Slide Lock for Gear-Driven Presses," published in a publication entitled "Metal Forming," October, 1994. This approach employs a locking arrangement for locking the slide of a press in fixed position which includes two spur gears with internal and external teeth. The external toothed gear is positively connected to one of the shafts of the press gear train and thus runs with the shaft during press operations. The gear with internal teeth is only movable axially and can be advanced and retracted by hydraulic actuation. When advanced, the gear with internal teeth meshes with the stopped externally toothed gear of the press gear train and because rotation is not possible, the gear train of the press is locked. Another approach employs a movable sector gear for engaging an idler gear which, in turn, engages an eccentric gear of the press. The sector gear is moved toward and away from the idler gear by means of a first motorized jack which controls engagement of the sector gear with the idler gear. The sector gear is also movable in a transverse direction tangential to the idler gear by means of a second motorized jack to provide for alignment of the teeth of the sector and idler, gears. A primary limitation of both of these approaches is that both are attached to and extend from the stamping press crown. This requires additional space adjacent to the press, which space is generally at a premium and frequently simply not available. In addition, these prior art approaches are overly complex and not easily adapted for retrofitting into existing stamping presses.

The present invention addresses the aforementioned limitations of the prior art by providing a slide lock for a stamping press which provides for the safe locking of the press slide and eccentric gears in a fixed position at virtually any location in the press stroke. The slide lock arrangement of the present invention is easily retrofitted within the crown of most stamping presses and provides axial positive mechanical locking of the press slide requiring the overcoming of the weight of the lock in travelling between the locked and unlocked positions.

OBJECTS AND SUMMARY OF THE INVENTION

Accordingly, it is an object of the present invention to prevent unintentional press slide movement by mechanically locking the press crown gears so that they cannot rotate.

It is another object of the present invention to provide an axial positive mechanical locking mechanism for locking the slide of a stamping press in fixed position where the locking mechanism own weight must be overcome to unlock the press slide.

Yet another object of the present invention is to provide a slide lock for a stamping press which includes a sector gear for engaging the press eccentric gear and employs electronic gear tooth seeking to ensure full mesh between the sector and eccentric gears.

A further object of the present invention is to provide a slide lock for a gear-driven press which is easily retrofit in existing presses without press modification and is positioned entirely within the press without requiring additional space around the press.

This invention contemplates a slide lock for a stamping press which is positioned within the crown of the press and engages an eccentric gear of the press and prevents its rotation. By locking the eccentric gear in a fixed position within the press, the press slide is also locked in fixed position permitting safe access to the inner workings of the press by workers such as for press repair or maintenance or replacement of the dies. The slide lock of the present invention includes a module having a hydraulic motor which powers an acme screw mounted on bushings in a thrust plate within the module. The acme screw is threaded in a nut which includes a pivot shaft mounted in front and rear brackets which are welded to the press crown. The slide lock module is thus free to pivot within the press crown. The slide lock module further includes an eccentric disposed in a sliding block. A hydraulic rotary actuator mounted on a bracket rotates the eccentric shaft within the sliding block The eccentric includes a mechanical stop which permits the eccentric to rotate slightly past top dead center to reach the unlocked position and to rotate slightly past bottom dead center to reach the locked position. Flag-type indicators are located on the front side and rear side of the stamping press. The flags are pneumatically actuated on a pivoting arm, with the locked and unlocked positions of the slide lock module actuating a mechanical valve to control the pneumatic cylinders for the proper flag indication as to the status of the inventive slide lock.

The slide lock is powered by a hydraulic drive system and an electrical control system. The stamping press must initially be at rest with the main motor off and the fly wheel stopped in order to engage the slide lock A "Slide Lock In" indicator switch initiates the slide lock procedure under one of the following conditions. The first condition involves the linear displacement of the slide lock module and proximity switch by the hydraulic motor. Movement is discontinued when the press eccentric gear is sensed. This signals the rotation of the slide lock eccentric by means of a hydraulic actuator to lower the slide lock toward the press eccentric gear and the locked position. The slide lock includes a sector gear, which if it is able to mesh with the press eccentric gear, allows the slide lock to continue downward, radial displacement toward the press eccentric gear. The slide lock eccentric rotates slightly beyond its center line, or beyond bottom dead center, until it engages a mechanical stop. At this point, the slide block module's sector gear and the press eccentric gear are fully in mesh and in a mechanically locked position. A limit switch senses the locked position, while the acme screw, nut and pivot shaft prevent rotation of the press eccentric gear and linear displacement of the press slide.

If the sector gear and eccentric gear are in a position where they cannot mesh, downward movement of the slide lock module is discontinued. A pressure sensor coupled to the slide lock eccentric determines when a selected pressure is exceeded indicating that the teeth of the sector and eccentric gears are in abutting contact and the two gears cannot mesh. When this selected pressure is exceeded, the slide lock module is linearly displaced generally tangentially relative to the press eccentric gear. When the abutting contact is relieved, the slide lock sector gear is able to mesh with the press eccentric gear, the slide lock module continues its downward, radial movement toward the eccentric gear until a locked limit switch is energized and a valve is shifted to a center position to stop the hydraulic motor.

It is possible that the sector gear and eccentric gear are in a position where the downward movement of the eccentric is stopped and the movement of the sector gear module toward the extended position is stopped. In this situation, the linear displacement of the sector gear module is reversed by the hydraulic motor. When the slide lock sector gear is able to mesh with the press eccentric gear, downward displacement of the slide lock module continues downward until the aforementioned locked limit switch is energized indicating complete gear mesh, the aforementioned hydraulic valve is moved to the center position to stop hydraulic motor operation, and displacement of the slide lock module stops.

A "Slide Lock Out" selector switch initiates the slide unlock procedure. The hydraulic actuator rotates the eccentric to raise the slide lock to the unlocked position. The slide lock eccentric will rotate slightly beyond its center line, or slightly beyond top dead center, until it engages a mechanical stop. Simultaneously, a limit switch senses the eccentric in the unlocked position and energizes a valve so that the hydraulic motor will move the slide lock module to the "home," or start, position. Limit switches for the extended and retracted positions of the slide lock module indicate an over travel condition and will provide a signal to the hydraulic motor causing the hydraulic motor to return the slide lock module to the home position.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENTS

Figure 1:
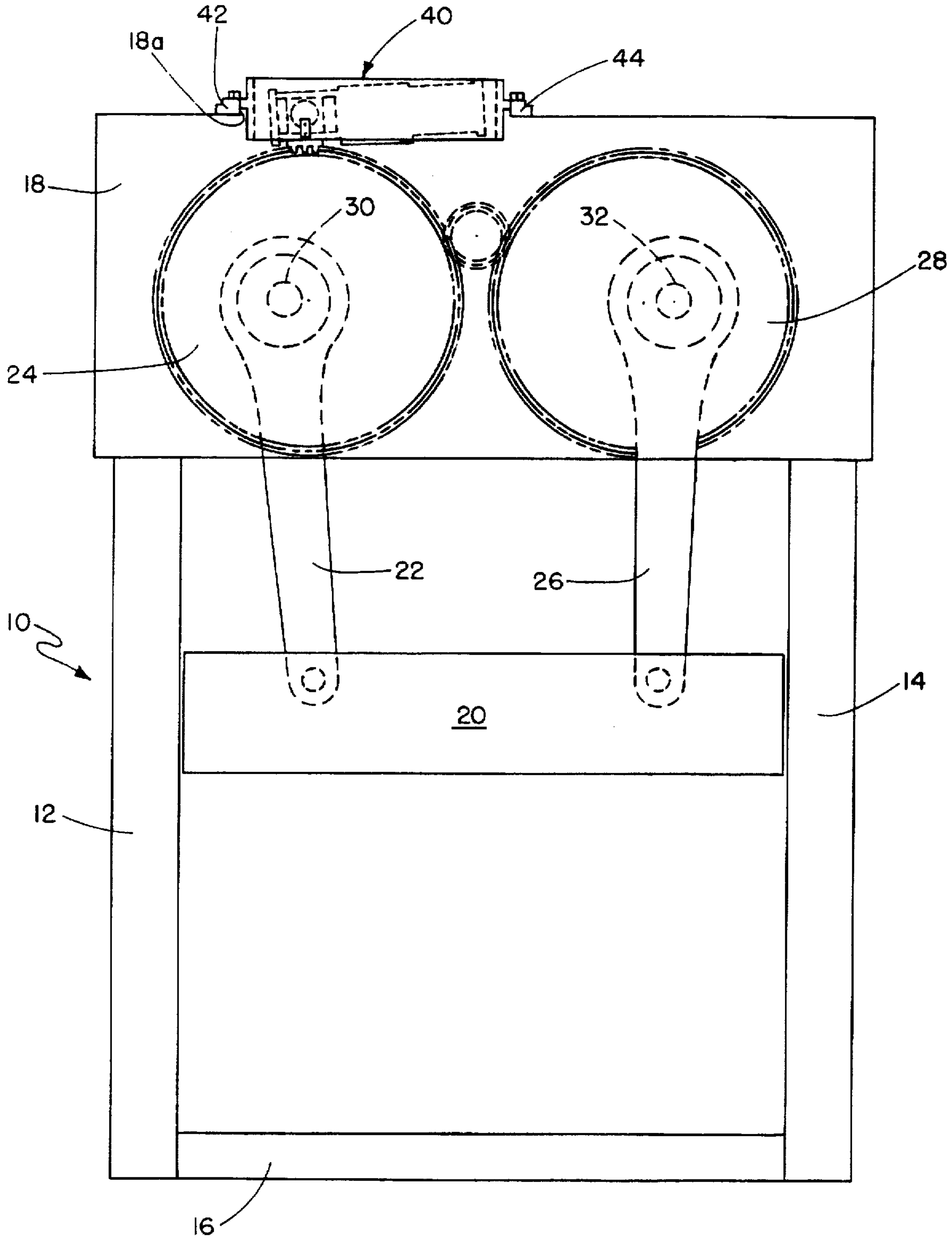
FIG. 1 is a simplified elevation view shown partially in phantom of a stamping press in which the slide lock of the present invention is intended for use.

Referring to FIG. 1, there is shown an elevation view partially in phantom of a stamping press 10 in which the slide lock 40 of the present invention is intended for use. Stamping press 10 includes upright supports including first and second upright columns 12 and 14 as well as a bolster plate 16 in a lower portion of the press and an upper housing, or crown, 18. Stamping press 10 further includes first and second eccentric gears 24 and 28 each having a plurality of spaced teeth around the periphery thereof and connected to a press drive system which is not shown in the figure for simplicity. The press drive system rotationally displaces the first and second eccentric gears 24, 28 in opposite directions. The first eccentric gear 24 is connected to a first slide arm 22 by means of a first connecting shaft 30. Similarly, the second eccentric gear 28 is coupled to a second slide arm 26 by means of a second connecting shaft 32. Synchronous rotation of the first and second eccentric gears 24, 28 results in a linear, reciprocating displacement of a press slide 20 pivotally attached to the lower ends of the first and second slide arms 22 and 26. An upper die is secured to the lower surface of slide 20, while a lower die is mounted to an upper surface of bolster plate 16 in the press. Stamping occurs when the upper and lower dies (which are not shown for simplicity) engage a metal piece part blank (also not shown) and form it into a desired shape and size.

The slide lock 40 of the present invention is adapted for attachment to the crown 18 of the press. Slide lock 40 is disposed in and extends across an aperture 18a in the upper surface of the press crown 18. Slide lock 40 is maintained securely in position within aperture 18a by means of the combination of first and second mounting brackets 42 and 44 securely attached to the upper surface of the press crown 18. Details of the structure and operation of the slide lock 40 of the present invention are set forth in the following paragraphs.

Figure 3:
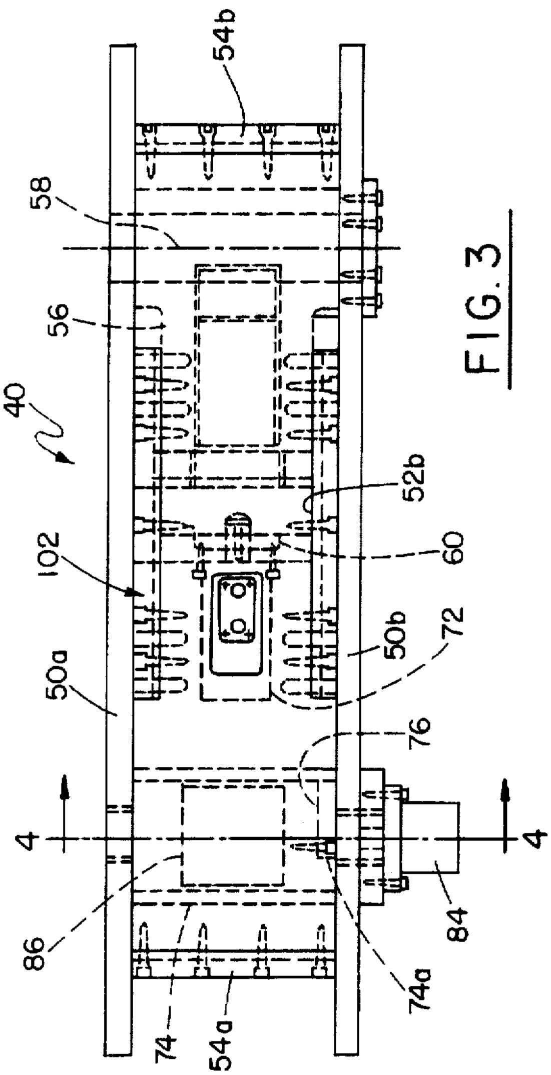
FIG. 3 is a top plan view shown partially in phantom of the stamping press slide lock shown in FIG. 2.
Figure 4:
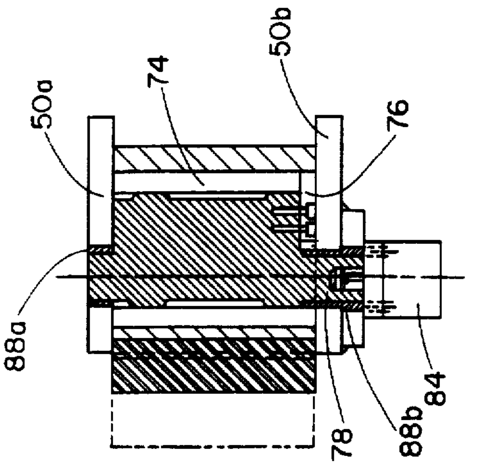
FIG. 4 is a sectional view of the stamping press slide lock shown in FIG. 3 taken along site line 4—4 therein.
Figure 2:
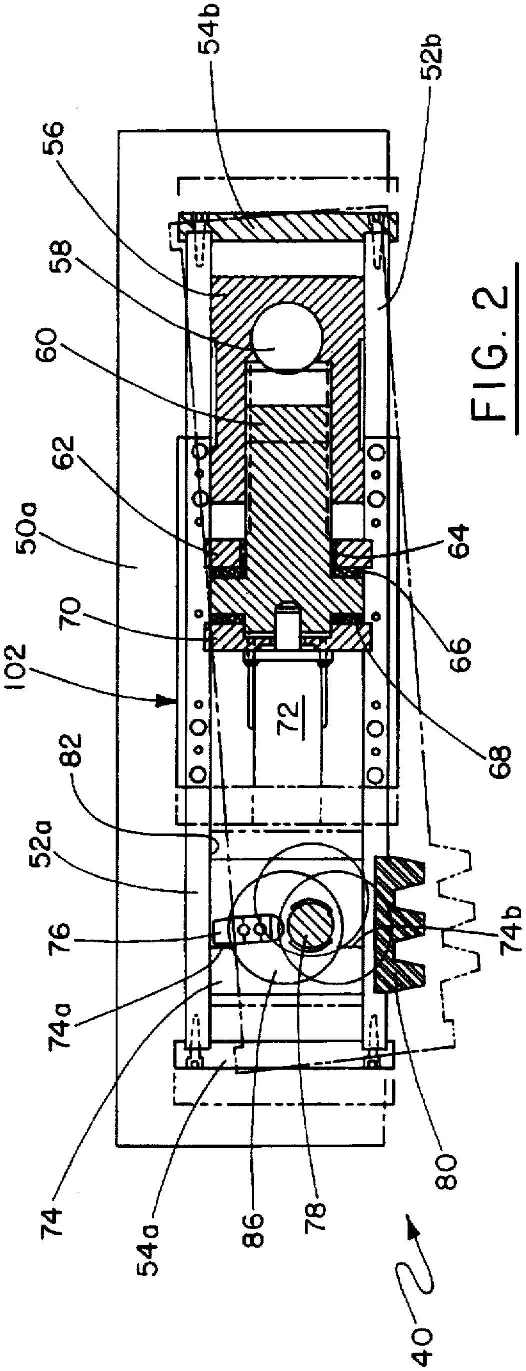
FIG. 2 is a side elevation view of the stamping press slide lock of the present invention shown partially in phantom and partially in section.

Referring to FIG. 2, there is shown partially in phantom and partially in section a lateral elevation view of the slide lock 40 of the present invention. FIG. 3 is a top plan view shown partially in phantom of the slide lock 40 of FIG. 2, while FIG. 4 is a sectional view of the slide lock shown in FIG. 3 taken along site line 4—4 therein.

Slide lock 40 includes first and second lateral mounting brackets 50*a* and 50*b* for attaching the slide lock to the crown of a stamping press. Slide lock 40 further includes top and partial bottom plates 52*a* and 52*b*, as well as first and second end plates 54*a* and 54*b*. Slide lock 40 further includes a slide lock module 102 which is disposed within the aforementioned plates and is pivotally coupled to the first and second mounting brackets 50*a*, 50*b* by means of a pivot pin 58. The partial bottom plate 52*b* allows for access to a press eccentric gear positioned below the slide lock 40 by a sector gear 80 attached to a lower portion of the pivoting slide lock module 102. The slide lock module 102 is thus freely pivotable as shown in dotted line form in FIG. 2.

The slide lock module 102 includes a hydraulic motor 72 coupled to an acme adjusting screw 60 which, in turn, is threadably connected to an adjusting nut 56. Adjusting nut 56 is connected to pivot pin 58 and can pivot upward and downward in a generally vertical direction. Disposed intermediate the hydraulic motor 72 and the acme adjusting screw 60 is a thrust plate motor mount 70, while disposed about the acme adjusting screw is a thrust plate 62. First and second thrust bearings 66 and 68 are respectively positioned between the acme adjusting screw 60 and the thrust plate motor mount 70 and thrust plate 62. A screw bushing 64 is also disposed intermediate the acme adjusting screw 60 and thrust plate 62. Rotational displacement of the acme adjusting screw 60 by means of the hydraulic motor 72 allows for extension of the acme adjusting screw out of the adjusting nut 56 along the longitudinal axis of the slide lock module 72 and retraction of the acme adjusting screw into the adjusting nut. The slide lock module 102 further includes a sliding block 74 adapted for sliding displacement within the slide lock module along its longitudinal length. Disposed within the sliding block 74 and freely rotatable therein is an eccentric 86. Attached to a lateral, flat surface of eccentric 86 is an eccentric stop 76. Eccentric 86 includes an off-access shaft 78 coupled to a rotary actuator, or motor, 84. Rotary actuator 84 rotationally displaces the combination of eccentric 86 and the eccentric stop 76 about a horizontal access extending through the center of the eccentric. Eccentric shaft bearings 88*a* and 88*b* facilitate rotation of the eccentric 86 within the sliding block 74.

A sector gear 80 attached to a lower portion of the pivoting slide lock module 102 is disposed below the sliding block 74 and eccentric 86 combination. Sliding block 74 includes an upper rotation stop 74*a* and a lower rotation stop 74*b*. When the eccentric 86 is rotated in a counterclockwise direction, its rotation is stopped when the eccentric stop 76 is generally vertical as shown in FIG. 2 with the eccentric stop engaging the sliding block's upper rotation stop 74*a*. Similarly, when the eccentric 86 is rotationally displaced clockwise by means of the rotary actuator 84, the eccentric rotates until its eccentric stop 76 engages the sliding block's lower rotation stop 74*b*. The upper and lower rotation stops 74*a*, 74*b* are disposed generally vertically relative to each other and form a lateral extension to the sliding block 74 and are in alignment with the eccentric stop 76 so as to engage the eccentric stop and limit rotation of the eccentric 86. The upper and lower rotation stops 74*a*, 74*b* are positioned so as to permit 190° rotational displacement of the eccentric 86. Thus, the upper rotation stop 74*a* is positioned 5° beyond top dead center (TDC), while the lower rotation stop 74*b* is positioned 5° beyond bottom dead center (BDC). Thus, to rotate the eccentric 86 beyond either the top dead center position or beyond the bottom dead center position, the weight of the eccentric as well as the weight of the slide lock module 102 to which it is coupled must be overcome. The eccentric 86 and eccentric stop 76 combination is shown in FIG. 2 with the slide lock in the unlocked position where the sector gear 80 does not engage a press eccentric gear. Clockwise rotation of the eccentric 86 and eccentric stop 76 combination to the full down position wherein the eccentric stop engages the lower rotation stop 74*b*, corresponds to the "locked" position with the sector gear 80 engaging a press eccentric gear.

Figure 6:
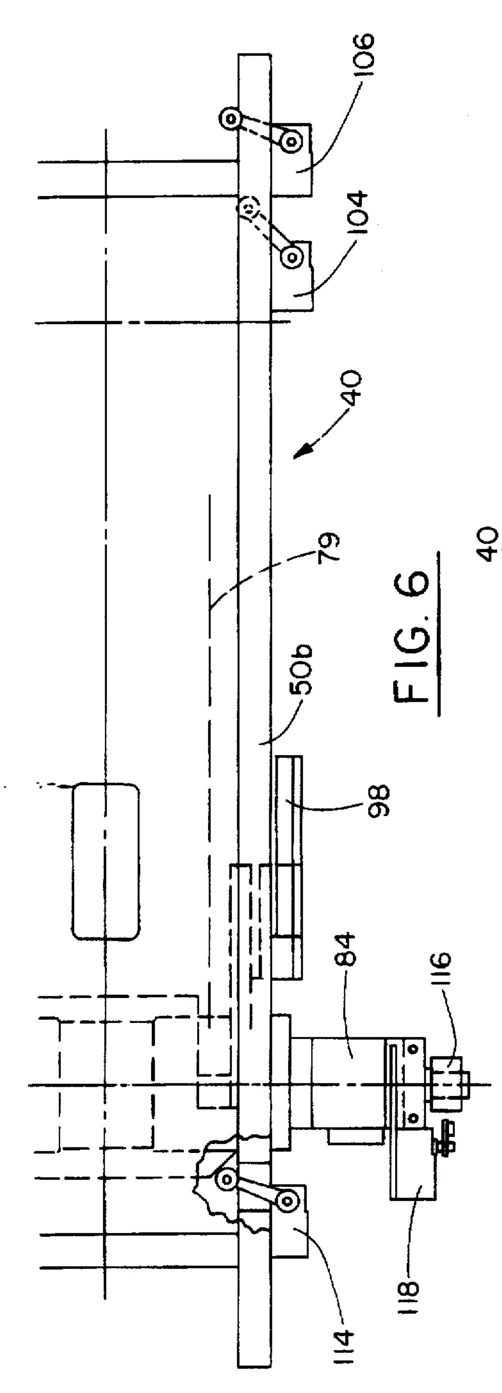
FIG. 6 is a partial top plan view of the stamping press slide lock shown in FIG. 5.
Figure 5:
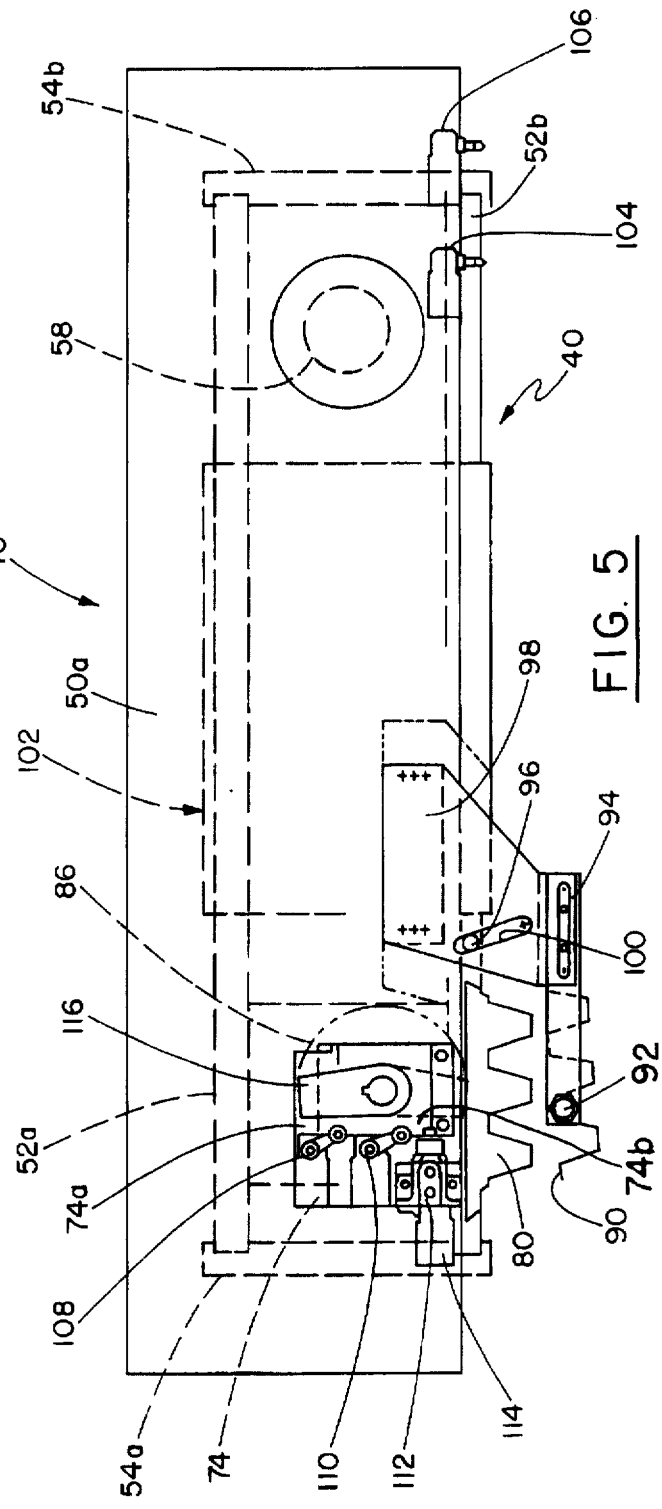
FIG. 5 is a side elevation view of the stamping press slide lock of the present invention shown partially in phantom illustrating structure for searching and locating a tooth of the eccentric gear of the stamping press.

Referring to FIG. 5, there is shown a lateral elevation view partially in phantom of the inventive slide lock 40 illustrating additional details of the slide lock module 102. A partial top plan view of the slide lock 40 shown in FIG. 5 is illustrated in FIG. 6. Attached to the rotary actuator 84, which rotationally displaces eccentric 86 within sliding block 74, is a switch actuator arm 116. Also attached to the rotary actuator 84 is a switch housing 118 which includes an upper unlocked limit switch 108 and a lower locked limit switch 110. Switch actuator arm 116 rotates with the eccentric stop described above under the influence of the rotary actuator 84. When the eccentric stop 76 is in the up position, with the slide lock unlocked, switch actuator arm 116 triggers the unlocked limit switch 108 providing an indication that the slide lock is unlocked. Similarly, when the eccentric stop 76 is in the locked position and engages the lower rotation stop 74*b* of the sliding block 74, the switch actuator arm 116 triggers the lock limit switch 110 indicating that the slide lock is in the locked configuration. The unlocked and locked limit switches 108, 110 are used to control operation of the slide lock as described in detail below. In addition, a redundant locked limit switch 114 is disposed adjacent to or is attached to the lower rotation stop 74*b* to detect the eccentric stop 76 in the lowered, locked position when it engages the lower rotation stop of the sliding block 74. Also attached to the switch housing 118 is a lock/unlock indicator valve which is of the mechanical type for providing a visual indication of the lock/unlock status of the slide lock as described in greater detail below.

Disposed on the side of the slide lock 40 adjacent the rotary actuator 84 is a linear slide bearing 98. Linear slide bearing 98 is fixedly mounted to a lateral portion of the slide lock 40 and moves with the slide lock when the slide lock is extended or retracted by means of the hydraulic motor and acme adjusting .screw combination described above. Attached to a lower portion of the linear slide bearing 98 is a switch bar 94 having a tooth seeking proximity switch 92 attached thereto. Disposed within the linear slide bearing 98 is an elongated, linear slot 100. Inserted through slot 100 is a drive rod 96. The tooth seeking proximity switch 92 is of the magnetic induction type and senses a tooth in the press eccentric gear 90 as the slide lock module 102 is displaced linearly and generally tangential to the press eccentric gear. In accordance with the present invention, if a pressure sensor coupled to the hydraulic rotary actuator 84 for eccentric 86 determines that the sector gear teeth and the teeth of the eccentric gear 90 will not mesh because the pressure applied to the rotary actuator exceeds a selected threshold value, the aforementioned hydraulic motor and acme screw combination initially extends the slide lock module 102 by displacing it toward the left as viewed in FIG. 5. When an eccentric gear tooth is detected by the tooth seeking proximity switch 92 indicating that the teeth of the sector gear 80 and 90 are aligned, the slide module eccentric 86 continues rotating so as to displace the sector gear radially toward the press eccentric gear until the two pairs of teeth are fully meshed. If the slide lock module 102 is displaced by the hydraulic motor and acme screw combination to the left to the fully extended position and alignment is still not detected by the tooth seeking proximity switch 92, the direction of displacement of the slide lock module is reversed and it is displaced toward the right as viewed in FIG. 5 by the hydraulic motor and acme screw combination until alignment between the teeth of the sector and eccentric gears is determined by the tooth seeking proximity switch. Thereupon, the slide lock module's eccentric 86 continues rotating clockwise to mesh the teeth of the sector gear 80 with the teeth of the eccentric gear 90.

Attached to the slide lock module 102 adjacent its pivoting end is an extend limit switch 104 and a retract limit switch 106. The extend and retract limit switches 104, 106 limit the extension and retraction of the slide lock module 102 within the slide lock 40. The extend limit switch 104 limits leftward displacement of the slide lock module 102, while the retract limit switch 106 limits rightward displacement of the slide lock module as viewed in FIG. 5. Drive rod 96 disposed within slot 100 in the linear slide bearing 98 insures that as the slide lock module 102 is lowered toward the eccentric gear 90, the slide lock module and the sector gear 80 attached thereto move toward the eccentric gear in a direction to permit meshing of the teeth of the sector and eccentric gears. Drive rod 96 is fixedly attached to the slide locks bottom plate 52*b* which moves during operation of the slide lock. The orientation of slot 100 within the linear slide bearing 98 is such as to restrict the downward movement of the slide lock module 102 to insure completely meshing of the sector and eccentric gears 80, 90 when their respective teeth are properly aligned. The tooth seeking proximity switch 92 attached to switch bar 94 is closely spaced with respect to the press eccentric gear to facilitate detection of a tooth of the eccentric gear which is represented in FIG. 6 by dotted line 79.

Figure 8:
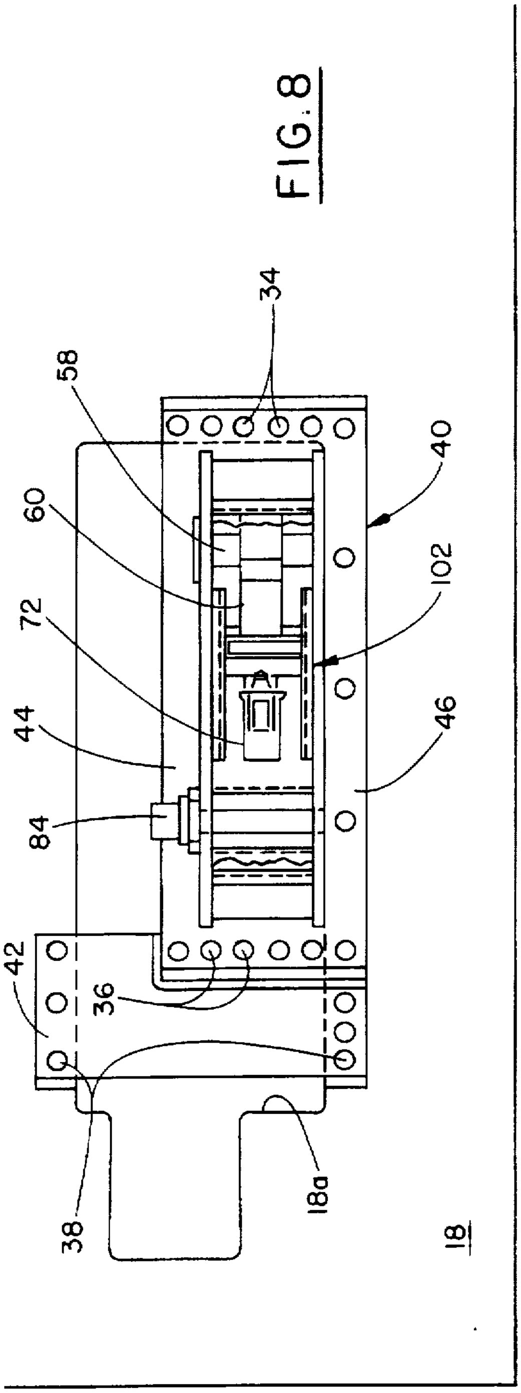
FIG. 8 is a top plan view of the slide lock mounted in a crown of a press as shown in FIG. 7.
Figure 7:
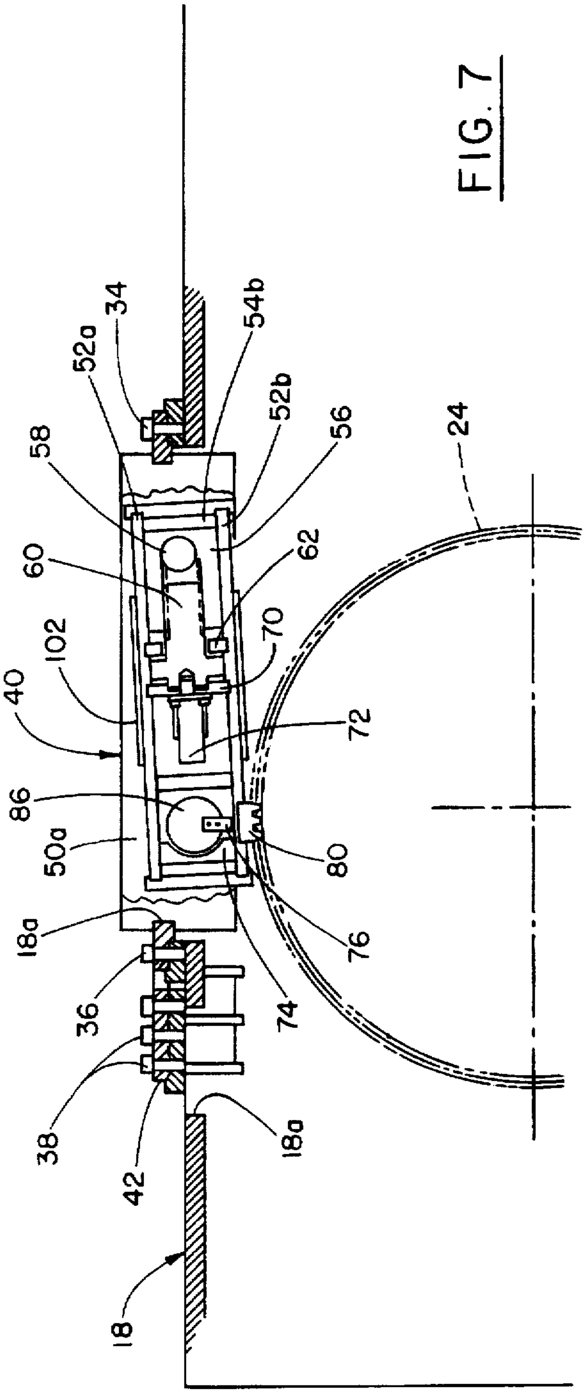
FIG. 7 is partially cut away sectional view of the crown portion of a stamping press illustrating the manner in which the slide lock of the present invention engages in eccentric gear of the press in locking the press slide in fixed position.

Referring to FIG. 7, there is shown partially in section and partially in phantom a slide lock 40 in accordance with the present invention engaging a press eccentric gear 24 in a locked manner so as to also lock the slide of the press in a fixed position. A top plan view showing the manner in which the slide lock 40 of FIG. 7 is mounted in an opening 18*a* in the crown 18 of a stamping press is shown in FIG. 8. As shown in FIG. 7, the eccentric 86 within the sliding block 74 of the slide lock module 102 has rotated clockwise to the full down position with the eccentric stop 76 pointing in the direction of the sector gear 80. The teeth of the sector gear 80 engage the teeth of the press eccentric gear 24. Other elements of the slide lock 40 shown in FIGS. 7 and 8 have been previously described and are not discussed herein. Slide lock 40 is mounted to the upper surface of the press crown 18 by means of a rear bracket 44 and a front bracket 46. One end of each of the rear and front brackets 44, 46 is attached to the upper surface of the press crown 18 by a plurality of first mounting bolts 34. A second end of each of the rear and front brackets 44, 46 is attached to a mounting bridge 42 spanning the aperture 18*a* within the crown 18 by means of a plurality of second mounting bolts 36. Mounting bridge 42 is securely attached to the upper surface of the press crown 18 by means of a plurality of third mounting bolts 38. In this manner, slide lock 40 is positioned within the aperture 18*a* in the upper surface of the press crown 18 and is disposed substantially within the stamping press.

Figure 9:
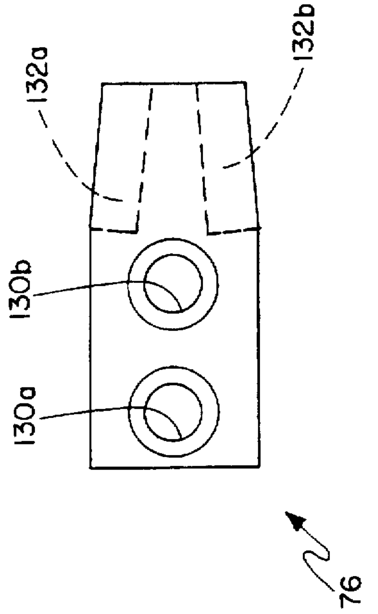
FIGS. 9 and 10 are elevation views shown partially in phantom of an eccentric stop used in the stamping press slide lock of the present invention.
Figure 10:
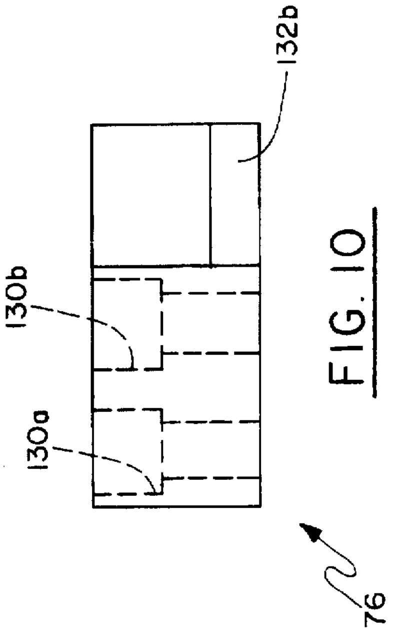
Figure 15:
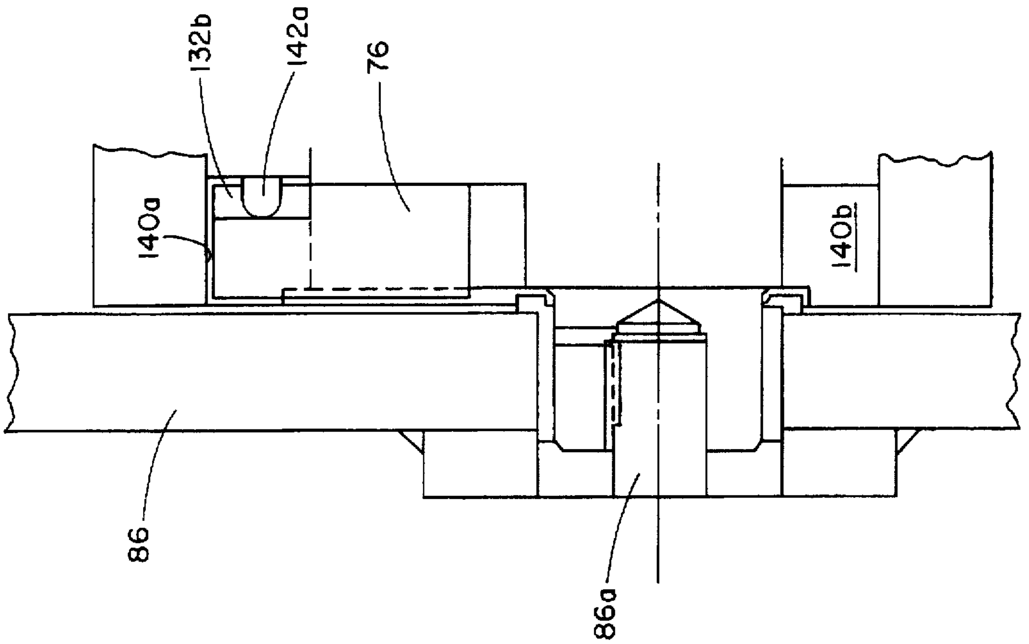
FIGS. 14 and 15 are side elevation and front plan views of a sliding block used in the stamping press slide lock of the present invention.
Figure 14:
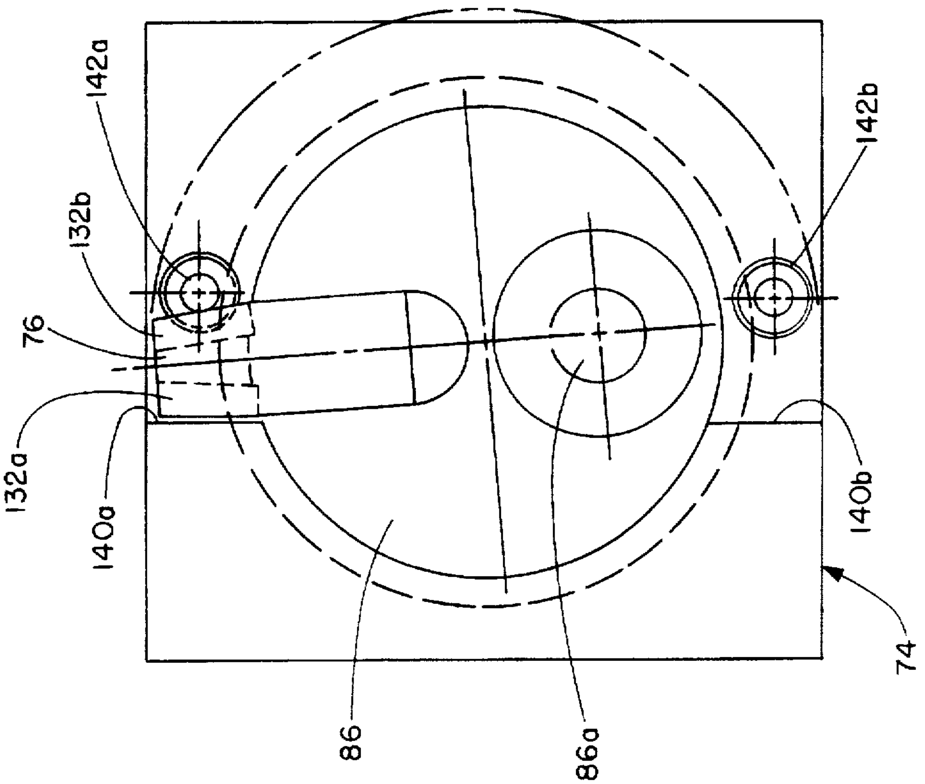

Referring to FIGS. 9 and 10, there are respectively shown partially in phantom side elevation views of the eccentric stop 76 used in the slide lock of the present invention. Eccentric stop 76 includes a pair of mounting apertures 130*a* and 130*b*, each for receiving a respective threaded coupler such as a bolt for attaching the eccentric stop to a flat side of the eccentric of the slide lock. First and second chamfered portions 132*a*, 132*b* are used to overcome the force of a pair of spring loaded plungers, one of which engages the eccentric stop 76 when in the full up, unlocked position and the other engages the eccentric stop in the full down, locked position. The first and second spring loaded plungers 142*a* and 142*b* are shown in the side elevation view of the sliding block 74 and eccentric 86 combination of FIG. 14. In FIG. 14, the first spring loaded plunger 142*a* engages the chamfered portion 132*b* of the eccentric stop 76 for maintaining the eccentric 86 in the unlocked position. The pressure exerted on the eccentric stop 76 by the first spring loaded plunger 142*a* is overcome by the rotary actuator which rotationally displaces the eccentric stop 76 and eccentric 86 combination in a clockwise direction toward the locked position. A partial front elevation view of the eccentric 86 and eccentric stop 76, where the chamfered portion 132*b* of the eccentric stop is shown engaged by the first spring loaded plunger 142*a*, is illustrated in FIG. 15.

Figure 12:
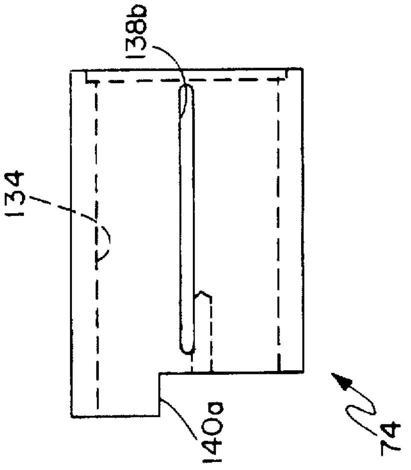
FIGS. 11, 12 and 13 are elevation views shown partially in phantom of a sliding block used in the stamping press slide lock of the present invention.
Figure 11:
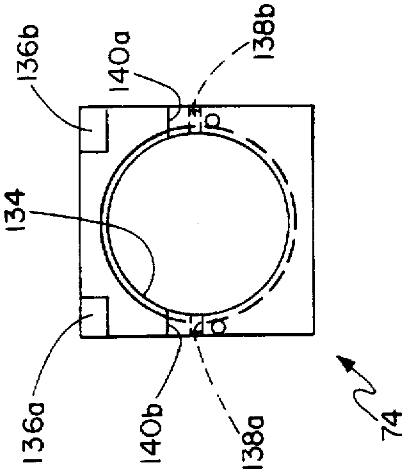
Figure 13:
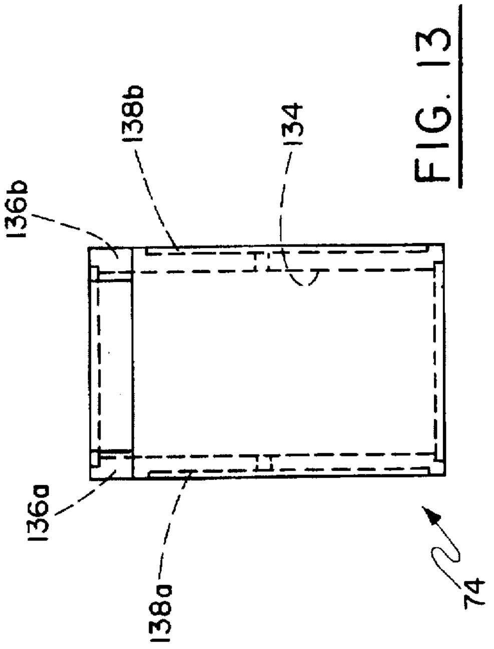

Referring to FIGS. 11, 12 and 13, there are shown partially in phantom elevation views of sliding block 74 used in the slide lock of the present invention. Slide lock 74 includes a generally cylindrical aperture 134 therein for accommodating the eccentric which is not shown in the figures. A lateral portion of sliding block 74 disposed adjacent aperture 134 extends outwardly from the main pivot portion of the sliding block and includes first and second stop surfaces 140*a* and 140*b*. The first and second stop surfaces 140*a*, 140*b* engage the eccentric stop (also not shown in the figures) for positioning the slide lock in the unlocked and locked configurations, respectively. First and second grease grooves 138*a* and 138*b* are disposed in opposed lateral surfaces of the portion of the sliding block 74 defining the cylindrical aperture 134 therein to facilitate rotational displacement of the eccentric within the cylindrical aperture. Upper and lower corner potions of sliding block 74 form first and second chamfered portions 136*a* and 136*b*. The chamfered portions 136*a*, 136*b* of the sliding block 74 are only on the upper and lower corners thereof and do not extend through the entire height of the sliding block. The upper chamfered corner portion 136*b* forms a notch in the sliding block 174, while the lower corner chamfered portion 136*a* accommodates the aforementioned lock limit switch 114. When the slide lock is in the lowered position, the portion which is not chamfered will trigger limit switch 114.

Figure 16:
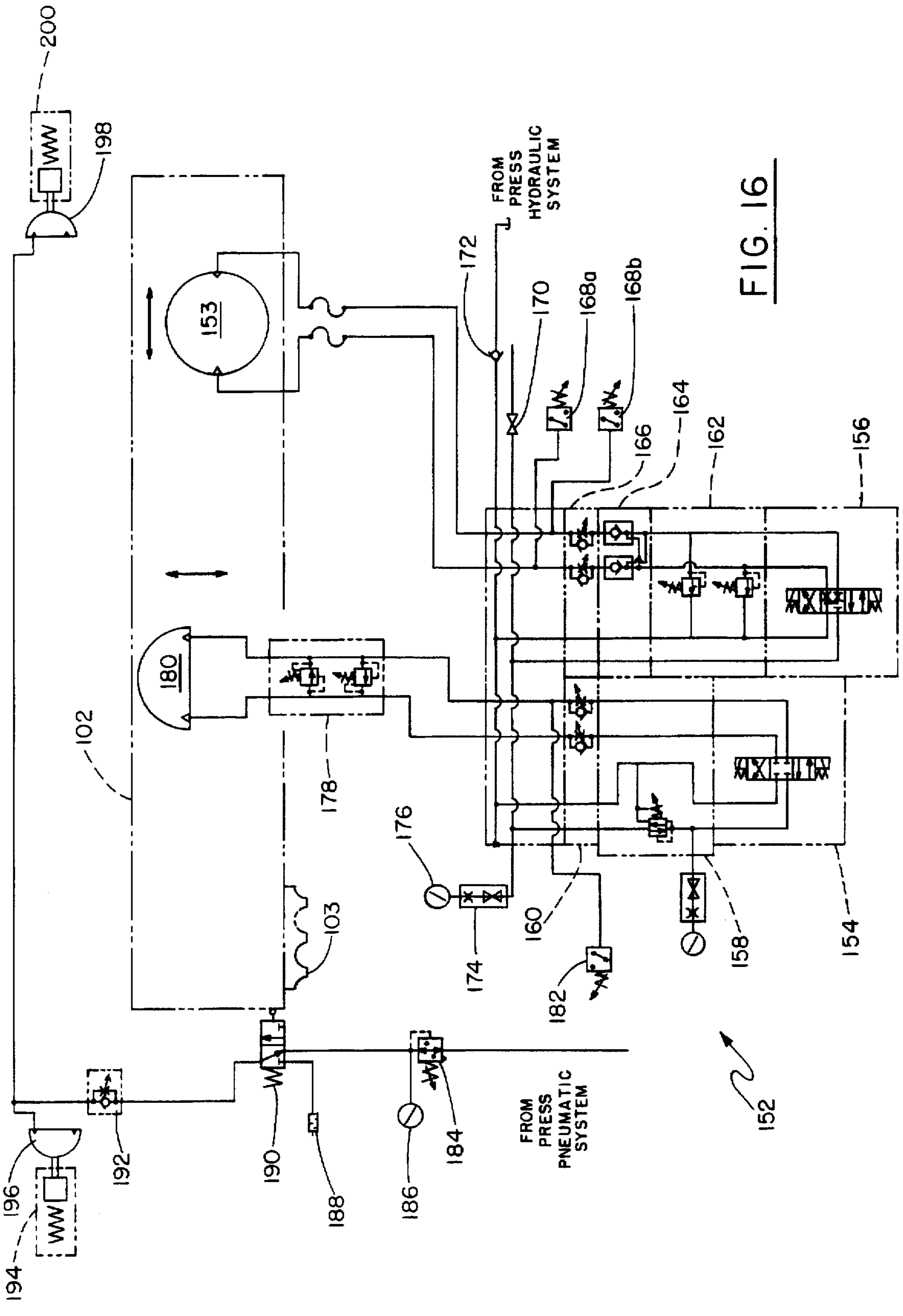
FIG. 16 is a simplified schematic diagram of a pneumatic and hydraulic control system for use with the stamping press slide lock of the present invention.

Referring to FIG. 16, there is shown a simplified schematic diagram of a hydraulic and pneumatic control system 152 for use in the slide lock of the present invention. Control system 152 includes first and second double solenoid four-way valves 154 and 156 respectively coupled to and controlling the slide lock's hydraulic rotary actuator 180 and the hydraulic motor 153. The hydraulic rotary actuator 180 rotationally displaces the slide lock's eccentric, while the hydraulic motor 153 linearly displaces the slide lock module 102 (shown in dotted line form) for aligning the teeth of the sector gear 103 with those of the eccentric gear teeth as previously described. The first double solenoid four-way valve 154 is coupled to the hydraulic system of the stamping press by means of a pressure reducing valve 158. The press hydraulic system (which is not shown in the figures for simplicity) is conventional in design and operation and includes a motor, pump and hydraulic tank. The first double solenoid four-way valve 154 is aim coupled to the hydraulic rotary actuator 180 by means of a dual meter-out flow restriction module 160 and a dual crossover relief valve 178. Similarly, the second double solenoid four-way valve 156 is connected to the hydraulic system of the stamping press by means of a dual relief valve module 162 which is coupled across the input and output lines to and from the second double solenoid four-way valve. The second double solenoid four-way valve 156 is also coupled to the hydraulic motor 153 by means of a dual pilot operated check module 164 and a dual meter-in flow restrictor module 166. First and second pressure switches 168a and 168b are coupled to the input lines from the second double solenoid four-way valve 156 to the hydraulic motor 153. A check valve 172 is incorporated in the input line from the press hydraulic system to the first and second double solenoid four-way valves 154, 156. A pressure switch 182 coupled between the hydraulic rotary actuator 180 and the first double solenoid four-way valve 154 measures the pressure required to rotate the slide lock eccentric and determines when this pressure exceeds a selected, or predetermined, threshold value such as when the teeth of the sector gear contact the teeth of the press eccentric gear. When this selected threshold pressure is exceeded, the second double solenoid four-way valve 156 actuates the hydraulic motor 153 for linearly displacing the slide lock module as previously described. Pressure switches 168a and 168b limit displacement of the slide lock module by the hydraulic motor 153 in the extended and retracted positions, respectively. A combination of a snubber isolator 174 and pressure gauge 176 is coupled to an input of each of the first and second double solenoid four-way valves 154, 156 and is further connected to the filtered press hydraulic system by means of a ball valve 170.

The hydraulic/pneumatic control system 152 is coupled to the press pneumatic system via the combination of a self-relieving regulator 184 and pressure gauge 186 and a muffle air silencer 188 and plunger cam valve 190. The pneumatic line is further coupled to front and rear pneumatic actuators 196 and 198 for the front and rear slide lock indicators 194 and 200 described below and shown in FIGS. 17 and 18 by means of a flow control valve 192. The front slide lock indicator 194 is connected to the front pneumatic actuator 196, while a rear slide valve indicator 200 is connected to the rear pneumatic actuator 198.

Figure 18:
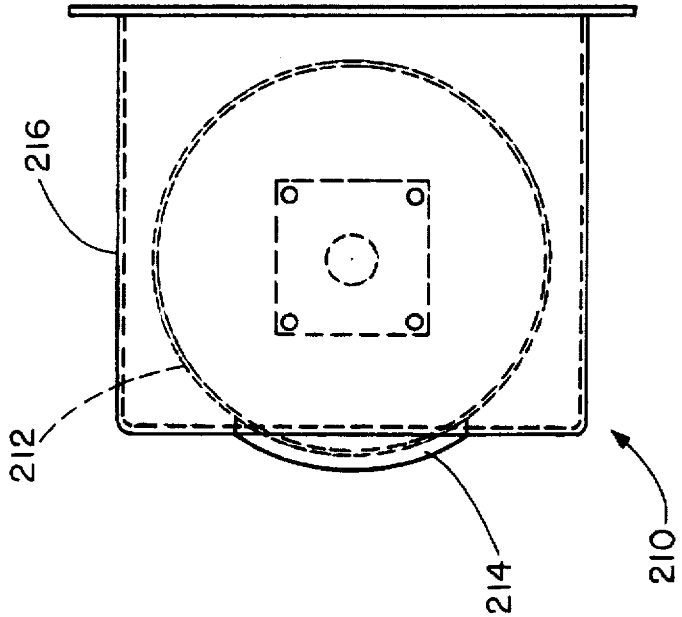
FIGS. 17 and 18 are respectively front and side elevation views shown partially in phantom of a slide valve indicator for indicating the status of the stamping press slide lock of the present invention.
Figure 17:
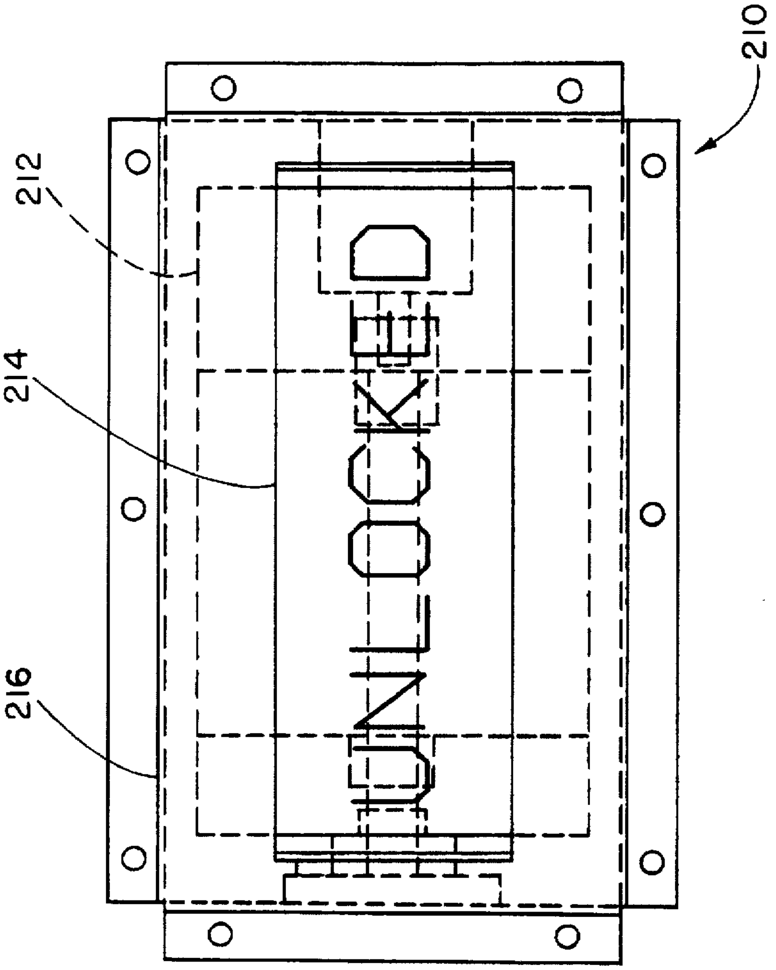

Referring to FIGS. 17 and 18, there are respectively shown front plan and side elevation views of a slide valve indicator 210 used in the slide lock arrangement of the present invention. Slide valve indicator 210 is pneumatically actuated, as described above, and includes a generally rectangular closed housing 216 within which is disposed a rotating cylinder 212. Disposed on the open, forward potion of housing 216 is a window, or lens, 214. The rotating cylinder 212, which may also be in the form of an angle iron, includes an "UNLOCKED" and a "LOCKED" indication on its outer surface. When the slide lock is unlocked, cylinder 212 is rotated so that the "UNLOCKED" indication appears in window 214 as shown in FIG. 17. When the slide lock is locked, the "LOCKED" indication appears in the indicator window 214. Also included in the slide valve indicator 210 is a pneumatic rotary actuator for rotationally displacing the cylinder 212 as described above and as shown in FIG. 16. The pneumatic rotary actuator is conventional in design and operation and is not described further herein.

There has thus been shown a slide lock for a stamping press which is adapted for positioning within the crown of the press adjacent its eccentric gears. The slide lock includes a hydraulically actuated, electrically controlled module pivotally mounted to the press crown having an acme screw and pivoting nut combination, a sector gear, an eccentric, and a sliding block coupled to and supporting the eccentric. Locking of the slide of the press in any position in the press stroke is initiated by the linear displacement of the slide lock module and by rotation of the eccentric to lower the slide lock module toward an eccentric gear. If the sector gear is able to fully mesh with the eccentric gear, i.e., the teeth of the sector and eccentric gears are aligned, the slide lock will continue to lower with the eccentric rotating beyond its centerline, or beyond bottom dead center, until it fully meshes with the eccentric gear. At this point, the eccentric triggers a pneumatically actuated closed or locked mechanical stop providing a visual indication that the slide is locked. When the sector gear and eccentric gear are fully in mesh, the eccentric is in an axial positive mechanical locked position to prevent press eccentric gear rotation and press slide movement. If the sector and eccentric gear are not able to mesh because of teeth misalignment, a hydraulic motor coupled to the acme screw linearly displaces the slide lock module generally tangential with respect to the eccentric gear through a pressure sensor control so that the sector gear is able to mesh with the eccentric gear. Rotation of the eccentric continues until the sector and eccentric gears are completely meshed and the eccentric is in the axial positive mechanical locked position with press eccentric gear rotation prevented and the press slide locked in fixed position. The sector gear and slide lock module are displaced linearly in first one direction and then, If necessary, a second, opposed direction until the teeth of the sector and eccentric gears are aligned for complete meshing of the gears.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. Apparatus for locking a slide of a stamping press having a rotating eccentric gear with a plurality of spaced first teeth disposed around the periphery thereof for linearly displacing said slide in a reciprocating manner, said apparatus comprising:

a housing pivotally coupled to the stamping press;

a sector gear attached to said housing and having a plurality of spaced second teeth;

first displacement means coupled to said housing for moving said sector gear tangential relative to the eccentric gear for locating said first plurality of teeth and aligning said first and second pluralities of teeth and for then moving said sector gear radially toward the eccentric gear for meshing said first and second pluralities of teeth:

pressure sensing means coupled to said first displacement means for determining when a tooth of said first plurality of teeth engages a tooth of said second plurality of teeth and a pressure applied to said first displacement means exceeds a selected pressure value; and, second displacement means coupled to said housing and responsive to the pressure measured by said pressure sensing means for displacing said housing generally tangential relative to the eccentric gear when the pressure exceeds said selected pressure value for aligning said first and second pluralities of teeth;

whereupon said first displacement means resumes radial displacement of said sector gear toward the eccentric gear with said first and second pluralities of teeth aligned until said first and second pluralities of teeth are fully meshed.

2. The apparatus of claim 1 further comprising a pivot pin for coupling said housing to the press.

3. The apparatus of claim 1 wherein said first displacement means includes a rotating eccentric coupled to said housing.

4. The apparatus of claim 3 wherein said first displacement means further includes a sliding block enclosing said eccentric, wherein said sliding block is displaced along a longitudinal axis of said housing and said housing is displaced toward the eccentric gear when said eccentric rotates in a first direction, and wherein said housing is displaced away from the eccentric gear when said eccentric rotates in a second, opposed direction.

5. The apparatus of claim 4 further comprising a first stop for limiting rotation of said eccentric in said first direction when the apparatus is locked, and a second stop for limiting rotation of said eccentric in said second direction when the apparatus is unlocked.

6. The apparatus of claim 5 wherein said first and second stops include first and second rotation stops attached to said sliding block and a stop arm attached to said eccentric and engaging said first rotation stop when unlocked and engaging said second rotation stop when locked.

7. The apparatus of claim 6 wherein said eccentric rotates beyond top dead center to arrive at the unlocked position and rotates beyond bottom dead center to arrive at the locked position to provide axial positive mechanical locking in said locked and unlocked positions.

8. The apparatus of claim 7 wherein said eccentric rotates 5° beyond top dead center to arrive at the unlocked position and rotates 5° beyond bottom dead center to arrive at the locked position.

9. The apparatus of claim 8 wherein said first displacement means further includes a rotary motor coupled to said eccentric.

10. The apparatus of claim 6 further comprising unlock and lock limit switches respectively coupled to said first and second rotation stops for providing a slide unlock signal and a slide lock signal, respectively.

11. The apparatus of claim 1 wherein said second displacement means comprises a hydraulic motor and an acme screw combination for displacing said housing generally tangential relative to the eccentric gear.

12. The apparatus of claim 11 wherein said hydraulic motor and acme screw combination moves said housing in a first direction until said first and second pluralities of teeth are aligned, and then in a second opposed direction if the teeth do not become aligned.

13. The apparatus of claim 11 further comprising a pivot pin coupling said housing to said stamping press and wherein said acme screw is inserted in an adjusting nut coupled to said pivot pin for pivotally coupling the housing to the stamping press.

14. The apparatus of claim 1 wherein said detecting means comprises a magnetic induction sensor.

15. The apparatus of claim 1 further comprising mounting means for mounting the apparatus in an opening in a crown portion of the stamping press adjacent the eccentric gear.

16. A slide lock for engaging an eccentric gear in a stamping press and locking a press slide coupled to and driven by said eccentric gear in fixed position, wherein said eccentric gear includes a first plurality of spaced teeth around the periphery thereof, said slide lock comprising:

a sector gear having a second plurality of spaced teeth;

rotary actuating means coupled to said sector gear for displacing said sector gear toward and in engagement with the eccentric gear when said rotary actuating means rotates in a first direction to assume a locked position and for displacing said sector gear away from the eccentric gear when said rotary actuating means rotates in a second, opposed direction to assume an unlocked position, wherein said rotary actuating means rotates more than 180° between said locked and unlocked positions and travels beyond a top dead center position in arriving at said unlocked position and beyond a bottom dead center position in arriving at said locked position; and linear displacement means coupled to said sector gear for moving said sector gear generally tangential relative to said eccentric gear when said first and second pluralities of teeth contact with one another as said sector gear is displaced toward said eccentric gear preventing meshing of said eccentric and sector gears; and sensor means coupled to and displaced with said sector gear for detecting a tooth of the eccentric gear and determining alignment of said first and second pluralities of teeth, whereupon said rotary actuating means continues displacing said sector gear toward the eccentric gear for complete meshing of said first and second pluralities of teeth.

* * * * *

UNITED STATES PATENT AND TRADEMARK OFFICE

CERTIFICATE OF CORRECTION

PATENT NO. : 5,713,237

DATED : 2/3/98

INVENTOR(S) : EILERT F. BRUNS

It is certified that error appears in the above-indentified patent and that said Letters Patent is hereby corrected as shown below:

| COLUMN | LINE | |
|---|---|---|
| 2 | 14 | "mechanism" should be -- mechanism's --. |
| 2 | 42 | After "block" there should be a period. |
| 2 | 56 | After "lock" and before "A" there should be a period. |
| 6 | 50 | The period before "screw" should be omitted. |
| 7 | 31 | "locks" should be -- lock's --. |
| 8 | 33 | Omit the word "pivot" before "portion." |
| 8 | 45 | "comers" should be -- corners --. |
| 9 | 2 | "aim" should be -- also --. |
| 9 | 52 | "potion" should be -- portion --. |

UNITED STATES PATENT AND TRADEMARK OFFICE

CERTIFICATE OF CORRECTION

PATENT NO. : 5,713,237

DATED : February 3, 1998

INVENTOR(S) : Eilert F. Bruns

It is certified that error appears in the above-indentified patent and that said Letters Patent is hereby corrected as shown below:

| Column | Line | |
|---|---|---|
| 10 | 30 | "then, If" should be -- then, if --. |

Signed and Sealed this

Thirtieth Day of June, 1998

*Attest:*

Bruce Lehman

BRUCE LEHMAN

*Attesting Officer*

*Commissioner of Patents and Trademarks*